Patented Feb. 25, 1947

2,416,325

UNITED STATES PATENT OFFICE 2,416,325

HIGH DRY HIDING PIGMENT PROCESS

Otto C. Klein, Baltimore, Md., assignor to The Glidden Company, Cleveland, Ohio, a corporation of Ohio No Drawing. Application April 12, 1944, Serial No. 530,726

4 Claims. (Cl. 106—295)

My invention relates to pigments, and particularly to pigments of high hiding power, and to methods of producing these improved pigments.

Many methods for producing pigments of desirable hiding characteristics have been described, in which the enhancement of these properties has been attained by the incorporation with a pigment of the precipitated reaction product of a water-soluble metallic silicate and a water-soluble mineral acid or metallic salt. Other methods comprehend the mixing of a water-insoluble silicate with an aqueous dispersion of a pigment such as lithopone or titanium oxide and filtering, subsequently drying the product which may or may not thereafter be calcined.

While improvements in hiding power have been thus obtained, in some cases to a considerable degree, it has been found that the resultant pigments in general have increased tendencies to settle out of the liquids usually associated with them in paints and other commercial preparations or compositions. Again, when such pigments containing sulfides have been utilized in paint compositions containing metallic driers, such as lead naphthenate or other lead salts, discoloration of the pigment has been found frequently to occur. The present invention contemplates the preparation of pigments which possess a high degree of dry hiding power, at least equivalent to that of the most efficient of the pigments referred to, and yet possess the additional benefits of increased resistance to settling and to discoloration when utilized in paint compositions containing lead driers.

It is an object of my invention to provide pigments of improved hiding power with the additional advantages of resistance to settling and to discoloration due to the presence of lead compounds used as driers.

Another object of my invention is to provide a process for the manufacture of these improved pigments.

Still another object of my invention is to produce pigments of improved hiding power by precipitating a water-insoluble borate on a base pigment.

It is yet another object of my invention to precipitate a water-insoluble borate on a base pigment under controlled conditions to produce a pigment of improved hiding power and characterized by the properties of improved suspension in liquid vehicles used in paint compositions and of resistance to discoloration due to action of metallic driers.

Other objects and a fuller understanding of my invention will become apparent from the following description and claims.

I may describe my invention as being concerned with the formation of an insoluble metallic borate upon a base pigment by first mixing a soluble borate such as borax ($Na_2B_4O_7.10H_2O$—sodium tetraborate) with an aqueous slurry of a base pigment, whose pH value has been adjusted to substantially 8.0 or above by means of any suitable water-soluble alkali, for example, sodium hydroxide. After agitation to assure thorough commingling of the borate solution and the base pigment, a solution of a water-soluble salt of a metal capable of forming water-insoluble borates, for example, zinc sulfate, is added to the mixture to convert the borax into the insoluble zinc borate which thus is precipitated on the base pigment. The resultant pigment is filtered, dried, and ground.

Experiment has shown that when the borate is added to the slurry subsequent to the addition of the water-soluble alkali to adjust the pH of the mass to the desired value before precipitation on the base pigment, more coverage of the base pigment with the borate is obtained, and the resultant product is materially better than one in which these steps are reversed, although both possess qualities which render them more effective with respect to hiding power, permanence of dispersion and resistance to discoloration by lead driers than the base pigment.

On the other hand, no substantial differences are observed in the final product if the order of addition of the precipitants be reversed. I may find it convenient first to dissolve the water-soluble salt of a metal which forms a water-insoluble borate in the aqueous slurry of the base pigment, and then to add the requisite amount of the aqueous solution of borate to this mixture. Regardless of the order of addition of the precipitants, the precipitated water-insoluble borate is uniformly distributed throughout the pigment.

It is also possible to precipitate the water-insoluble borate externally and subsequently to incorporate this precipitate in the base pigment slurry. The resultant product, after separation, drying and grinding, will possess a dry hiding power considerably greater than that of the base pigment, but in general of a lower order than a pigment of identical composition prepared by precipitation in situ.

The quantity of water-soluble borate used may vary between 0.5% and 20.0% of that of the base pigment used, but usually the most satisfactory results may be obtained when the proportions are between 2% and 3% of the weight of base pigment.

The base pigments which are employed in general comprise white pigments, sulfide pigments, zinc sulfide-containing pigments, lithopone pigments, titanium dioxide pigments, cadmium sulfide pigments and the like.

The following examples are given to illustrate the nature and scope of my invention, and it will be understood that a considerable degree of variation is possible without departing from the spirit and scope of the invention.

Example 1

400 grams of lithopone are slurried in water and to the slurry is added 10 cc. of a 2% solution of sodium hydroxide. To this mixture is now added 10 grams of borax and the mixture is agitated while the solid borax is dissolved in the water. After this operation has been completed, and during continued agitation, 65 cc. of a 10% aqueous solution of zinc sulfate are added to the slurry. After precipitation is completed, the pigment is filtered, dried and ground. The precipitation is effected at a pH of substantially 8.8, the addition of the sodium hydroxide having been made to bring the base pigment slurry to a value of at least 8.0 or preferably slightly higher. The product obtained by the above process was found to possess high dry hiding powers in comparison with the base pigment used, the evaluation being made by the standard test method D-406-39 of the American Society for Testing Materials. In addition it was found to be satisfactorily resistant to settling from liquid compositions in which it would customarily be employed, and that it possessed satisfactory characteristics with reference to the employment of lead driers in paint compositions.

Example 2

400 grams of lithopone are slurried in water, and to this slurry is added 10 cc. of a 2% solution of sodium hydroxide. 10 grams of borax are added to the mixture while agitation is maintained to dissolve the borax and keep the base pigment in suspension. When solution has been effected, an aqueous solution containing 2 grams of calcium acetate is added to the slurry, agitation being continued. After precipitation has been completed, the resultant pigment is filtered, dried, and ground.

The pH of the slurry prior to addition of the calcium acetate solution is substantially 8.8. The product was found to be suitable for incorporation in paint preparation, and when so utilized was found to possess the same valuable properties as were identified in the pigment prepared in Example 1.

Example 3

400 grams of lithopone are slurried as before, and the same quantity of sodium hydroxide solution added for adjustment of the pH to the desired value. 2 grams of borax are dissolved, with constant agitation of the mixture, and complete solution is effected. 11 cc. of a 10% solution of zinc sulfate are now added, and precipitation occurs as before, during continued agitation of the mixture. The pigment is filtered, dried, and ground as before.

The pH of the slurry before precipitation is substantially 8.6.

On incorporation of this pigment in a paint composition, it is found to possess substantial dry hiding powers together with the other desirable characteristics sought.

I have discovered by experiment that the improvement in dry hiding power reaches a maximum with substantially the concentration of soluble borate used in the first example, while the proportion of soluble borate obtained in the third example represents approximately the minimum concentration which must be employed to obtain a pigment with satisfactorily improved hiding power.

In the practice of the invention, it is preferable to introduce the water-soluble borate into the aqueous slurry, and then to precipitate the water-insoluble borate by the addition of the salt. It has been found that when this sequence is maintained, the precipitate is formed in a finely dispersed form suitable for adsorption upon the base pigment and for uniform distribution through the mass of pigment. When the order is reversed, a greater degree of care must be exercised to assure a perfectly homogeneous product, since the precipitate has a tendency to flocculate.

At concentrations of soluble borate substantially greater than that which I have postulated as the effective maximum, the dry hiding power of paints prepared from the pigment is not proportionately improved over that obtained at the defined upper limit, while at concentrations lower than the postulated minimum, a satisfactory degree of improvement is not usually attained.

While it is to be understood that the definite limits for the improved pigments containing zinc borate are substantially as disclosed above, when insoluble borates of other metals are used, the limits will not be identical, but will fall within the range which I have set forth, namely equivalent to a proportion of sodium borate ($Na_2B_4O_7.10H_2O$) to the weight of the base pigment of between 0.5% and 20%, and preferably in the range between 2% and 3%.

These improved pigments possess the valuable and important qualities herein described when incorporated in all types of vehicles usually employed in paint compositions, but are specially suited to the manufacture of paints, which utilize aqueous solutions of casein or like composition, to which water-soluble borates are frequently added for purposes of stabilization.

Although I have described my invention with some degree of particularity, it is understood that the examples given in the disclosure are solely for purposes of illustration, and many changes may be made in the examples given without departing from the spirit and scope of my invention.

What I claim is:

1. The method of treating sulfide-containing pigment to improve its hiding power, to increase its resistance to settling and to increase its resistance to discoloration in the presence of lead driers, said method comprising the steps of: preparing an aqueous slurry of said pigment; adding a water-soluble alkali to said slurry to establish therein a pH of at least 8; introducing a water-soluble borate into the slurry in the proportion of from about .5% to 20% by weight of the sulfide-containing pigment; precipitating the said borate by introducing a water-soluble salt of a metal which forms water-insoluble borate; and separating the solids from the slurry to recover the improved pigment.

2. The method as claimed in claim 1 wherein the precipitation of the borate is effected by introducing a water-soluble zinc salt.

3. The method as claimed in claim 1 wherein said sulfide-containing pigment is lithopone.

4. The method as claimed in claim 1 wherein said sulfide-containing pigment is lithopone, and wherein the precipitation of the borate is effected by introducing a water-soluble zinc salt.

OTTO C. KLEIN.

REFERENCES CITED

The following references are of record in the file of this patent:

UNITED STATES PATENTS

| Number | Name | Date |
|---|---|---|
| 1,876,088 | Stephens et al. | Sept. 6, 1932 |
| 1,714,408 | Stephens et al. | May 21, 1929 |
| 2,296,639 | Hanahan | Sept. 22, 1942 |